Oct. 2, 1945.  F. B. YINGLING  2,385,959
VALVE OPERATING MECHANISM
Filed June 13, 1941   3 Sheets-Sheet 1

Inventor
FRANK B. YINGLING
Chas. K. Davies & Son
Attorneys.

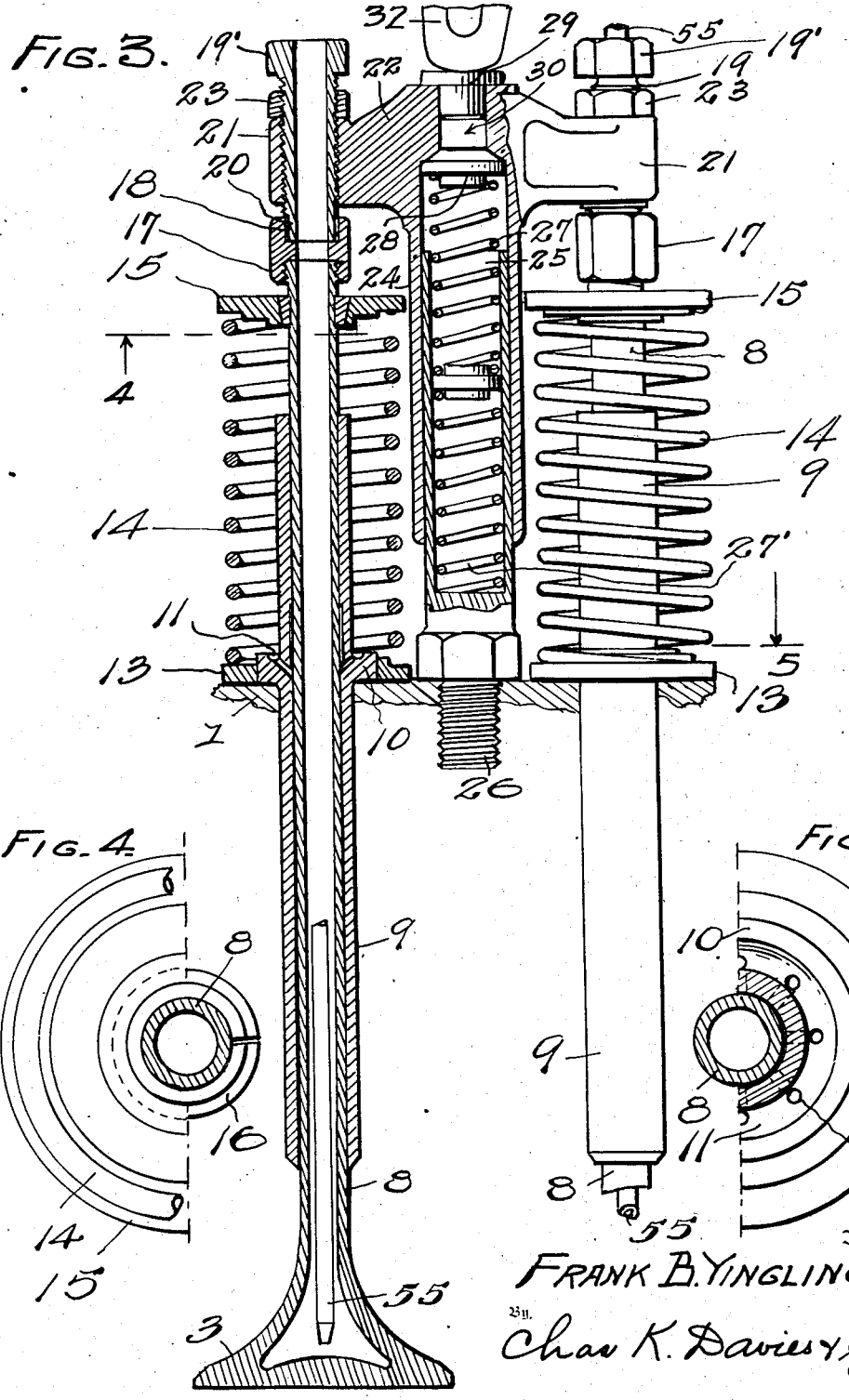

Oct. 2, 1945.  F. B YINGLING  2,385,959
VALVE OPERATING MECHANISM
Filed June 13, 1941  3 Sheets—Sheet 3
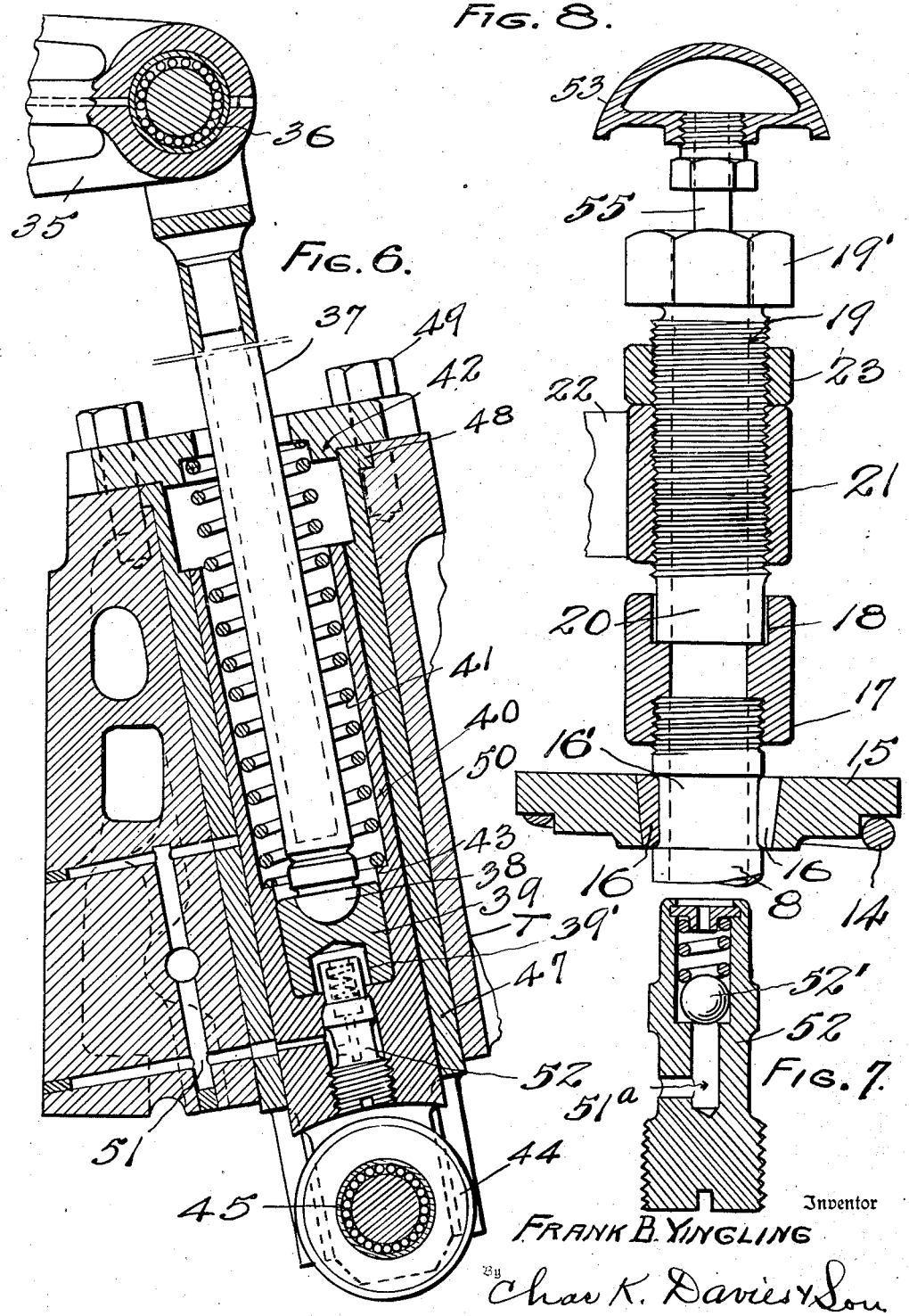
Inventor
FRANK B. YINGLING
Attorneys Patented Oct. 2, 1945

2,385,959

UNITED STATES PATENT OFFICE 2,385,959

VALVE OPERATING MECHANISM

Frank B. Yingling, Hamilton, Ohio

Application June 13, 1941, Serial No. 397,958

4 Claims. (Cl. 123—90)

The present invention pertains to valve operating mechanism for use with the exhaust valves of compression-ignition or Diesel engines, and the subject matter of this application for patent is a continuation in part of the invention involved in the two cycle internal combustion engine of my pending application for patent Serial No. 350,750 filed August 3, 1940.

In the engine referred to each cylinder head is provided with four openings or valve seats through which the spent gas is exhausted, or removed by the scavenging air currents after the power stroke of each reciprocation of the piston. These four openings are controlled by four complementary inwardly opening valves which are held to their seats by springs, and the valves are depressed in pairs by the operating mechanism to open position as will be described.

Preferably the combined area of the four valve-seats in the cylinder head is so proportioned to the cross area of the cylinder as to facilitate scavenging of the combustion chamber, and charging the chamber with air for fuel combustion, thus contributing to the development of maximum horse power of the engine.

The four valves for each cylinder of the engine are arranged in pairs, in the nature of two dual or duplex valves, and similar operating mechanisms depress a pair of the dual valves, each of the two operating mechanisms being actuated from the cam shaft of the engine. The valve operating mechanism is compactly arranged in order to occupy a minimum amount of space and a minimum of parts are employed to simplify the construction and operation of the mechanism for each set of the valves, and the parts are so arranged that they may be assembled with facility, and when necessary they may be dismantled with equal facility.

As is well known, close contact and adjustment between adjoining parts of the operating mechanism for exhaust valves in compression-ignition engines is difficult to maintain, due in part to the expansion and contraction under varying differences in the degrees of temperature, between the cold engine when it is not running, and the warm or hot engine when the latter is running. By the use of a "floating" bearing or fluid-pressure-supported bearing for the push-rod in the tappet mechanism, compensation is made for possible lost motion and back-lash is eliminated from the operating mechanism, and in addition noise is practically eliminated from the smoothly-operating parts due to the close contact of parts from the cam mechanism to the reciprocating valves.

The invention consists in certain novel combinations and arrangements of parts involving the dual or duplex valves and their operating mechanism as will hereinafter be more fully set forth and claimed. It will be understood that changes and alterations may be made in the invention as exemplified in the accompanying drawings within the scope of my claims, without departing from the principles of my invention.

Figure 3 is an enlarged detail view with parts in vertical section showing a pair of duplex valves, together with the resiliently supported, depressible, cross-head in which the tappets are mounted, and also indicating the contact end of the rocker arm or pivoted tappet lever frictionally engaging the cross-head.

Figure 4 is an enlarged, detail, fragmentary sectional view as at line 4 in Figure 3, showing one of the tubular valve stems together with a split, resilient, attaching washer and its accompanying spring-washer.

Figure 5 is a view similar to Figure 4, as at line 5 in Figure 3, showing one of the lower spring-washers, and supporting flange on the tubular valve guide.

Figure 6 is an enlarged, vertical, detail, sectional view of the tappet mechanism for a pair of valves, including the push-rod located in the tubular spring-depressed roller-plunger, and the cam-actuating mechanism, together with a portion of the rocker arm or tappet lever.

Figure 7 is an enlarged detail sectional view of the control or check valve located in the tubular plunger and instrumental in "floating" the bearing support for the push-rod.

Figure 8 is a detail sectional view showing the adjustment of the valve-tappets.

Figure 2:
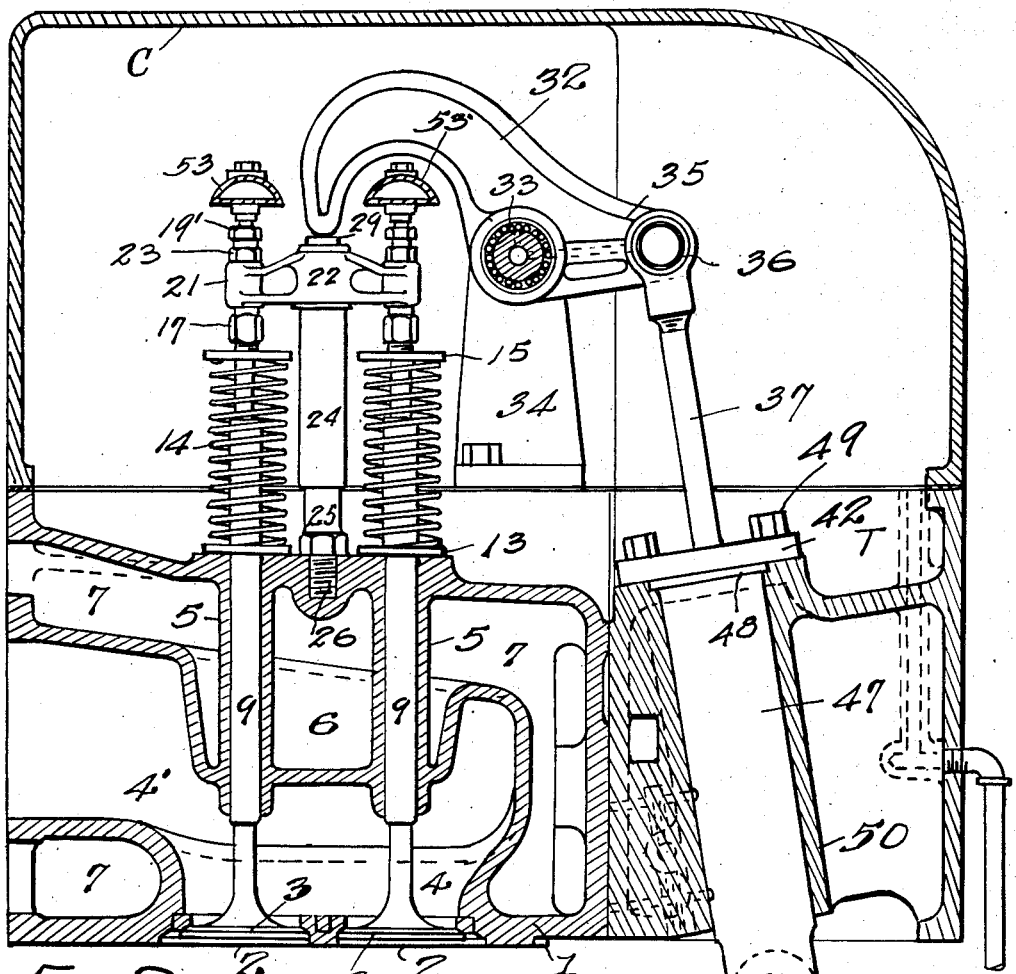
Figure 2 is an enlarged, vertical, sectional view as at line 2—2 of Figure 1, showing one of the cylinder heads of a multi-cylinder engine, the tappet housing and cover, together with one of the dual-valve units and a single operating mechanism therefor.

In order that the general arrangement and relation of parts may readily be understood I have shown in Figure 2 the general assembly of a cylinder-head unit, one of which is employed with each cylinder of a multi-cylinder engine. This unit includes the cylinder head 1 fashioned in one piece; the tappet housing T located also above the engine block and secured to the cylinder-head 1; and the cover C that is secured to the cylinder-head and the tappet-housing.

The bottom face of the cylinder-head 1 is fashioned with two pairs of holes or valve-seats 2, 2, 2, 2, and these openings are controlled by the four hollow valves 3, 3, 3, 3, which when depressed open downwardly into the combustion chamber to permit scavenging movement of exhaust gas up into the valve chamber 4, and thence through the exhaust chamber 4' to the exhaust manifold, not shown.

The cylinder head is also fashioned with four spaced integral sleeves 5 that are integral with the walls of a depressed well 6, and this well, which is open to the surrounding water space 7 of the cylinder head, assists in cooling the operating parts by permitting circulation of cooling currents around the sleeves 5 in addition to the circulation of the cooling medium through the spaces 7 of the cylinder head.

As indicated, in Figure 3 the valve 3 has a hollow head and a tubular stem 8, and the stem is arranged to reciprocate vertically in its barrel or sleeve 9 which is fitted into one of the sleeves 5 and forms the guide for the reciprocating valve stem 8.

As indicated in Figure 3 the dual valves comprising a valve unit, of which there are two units, are of similar construction and operation and therefore the description of a single valve will suffice for the four valves installed with a cylinder.

As best seen in Figure 3 the guide-barrel 9 is stationary in the sleeve 5, and the guide barrel is fashioned with an annular exterior flange 10 that rests upon the top face of the cylinder head 1. In the upper face of the flange an annular groove 11 is provided and ports 12 extend from this oil groove to the interior bore of the guide barrel 9 to lubricate the valve stem 8 as it reciprocates in its guide barrel.

A flat spring-ring 13 is mounted on the exterior of the flange 10 and the spring ring, which rests also upon the upper face of the cylinder head, supports the lower end of the valve spring 14 that is interposed between this spring-ring and the spring-washer 15 spaced a suitable distance above the spring-ring 13. This spring washer 15 is rigidly mounted near the upper end of the valve stem through the use of a split tapered washer 16 that is mounted on the reduced portion or neck-portion 16' (Fig. 7) of the drawings. The upper open end of the valve stem is threaded as indicated, and it will be apparent that the split resilient washer and the spring washer 15 may be slipped over this open end of the stem and mounted on the neck 16' of the valve stem when the parts are being assembled, and with equal convenience the parts may be dismantled when required.

On the upper open end of the valve stem, above the spring washer 15 a cap nut is threaded, and this nut 17 as shown is fashioned with an upper open socket 18 here shown as cylindrical in shape, and of sufficient depth to cooperate with an adjustable bushing 19 having its lower end 20 fitted therein.

The bushing 19 is exteriorly threaded and it is provided with a nut-shaped or angular head 19' so that the bushing may be adjusted within the bearing head 21 of the cross-head 22. Two of these crossheads are indicated as 22 and 22' in Figure 1 and it will be understood that one crosshead is provided for each pair of valves.

The smooth lower end 20 of the adjusting bushing 19 is neatly fitted in the socket 18 of the cap-nut 17, and it will be apparent that by the use of a wrench on the head 19' the bushing may be turned to depress the valve stem and valve against the tension of the valve spring 14, thus adjusting the valve with relation to its seat, and then a lock nut 23 on the bushing is turned down against the top of the head 23 to secure the adjustment.

The crosshead, which coacts with dual valves, is fashioned with a tubular sleeve 24 that telescopes over a tubular post 25, which through the use of a threaded stud 26 integral with its lower end is fastened rigidly on top of the cylinder head 1, and springs 27 and 27' are mounted in these telescoping parts 24 and 25. The springs are interposed between the closed lower end of the tubular post and a spring-cap or button 28 located in the head 22 at the upper end of the tubular or sleeve portion of the crosshead.

A tappet pin or anvil 29 is mounted in a socket 30 formed in the crosshead and forming a continuation of the interior bore of the sleeve 24, and the tappet mechanism co-acts with this pin to depress the crosshead and its valves against the tension of springs 14, 27, and 28.

Figure 1:
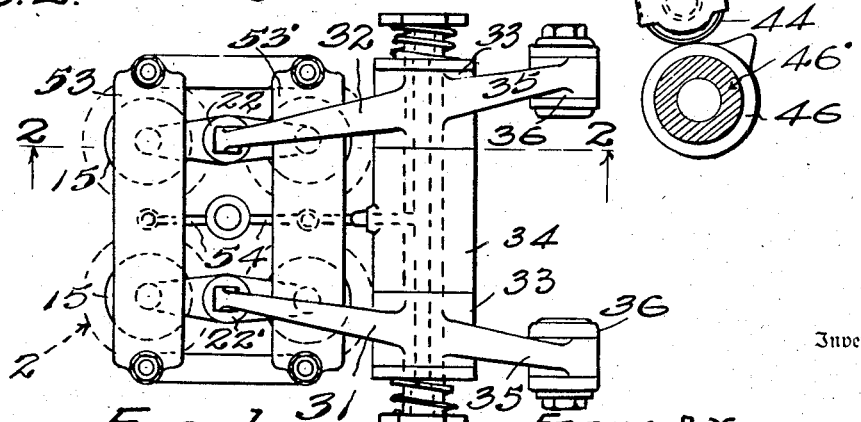
Figure 1 is a conventionalized top plan view indicating four exhaust valve units as employed with a single cylinder of a two cycle compression-ignition multi-cylinder engine, showing two spaced valve operating units, one operating unit for each pair of valves.

Two tappet mechanisms are indicated in Figure 1 including the tappets or levers 31 and 32 that contact with the tappet pins 29 and 29 of the two cross heads to depress and open the valves, and of course the springs co-act with the intermittent motion of the tappet mechanism to return the valves to closed position.

A pair of these tappet levers or rocker-arms are shown as pivoted in bearings 33 of a bracket 34 that is fastened, as by bolts on the upper or top face of the cylinder-head 1, and the short arm 35 of each of the tappet levers is pivotally connected at 36 to a clevis provided at the upper end of the tubular push-rod or tappet rod 37 that depends from the end of the lever arm, and is reciprocated to oscillate or rock the tappet lever 32 for operation of the valves.

As best seen in Figure 6 the lower end of the push-rod is fashioned with a rounded or hemispherical bearing head 38 which fits neatly in a socket or recess in the upper end of a reciprocable or slidable bearing block 39 which is slidably mounted or "floated" in the lower end of a tubular spring holder or plunger 40 that forms a continuation of the push-rod or tappet rod 37. The slidable bearing block, in the nature of a cylindrical piston, in addition to its upper bearing socket or recess, is also fashioned with a lower open recess 39' that provides an oil chamber beneath the bearing block, and oil under pressure is supplied thereto from the oiling-system pump to "float" the bearing block, as will be described.

Within the tubular spring holder or plunger 40 a depressing spring 41 is interposed between a cover plate 42 and a shoulder 43 fashioned in the interior of the tubular plunger just above the slidable bearing block 39, and this spring which is coiled about the push-rod, tends to depress the tubular plunger 40 as indicated in Figure 6. The tubular plunger 40 is intermittently lifted through the co-action instrumentality of a roller 44 journaled at 45 in the lower end of the tubular plunger and a cam-roller 46 mounted on the cam-shaft 46' as indicated in Figure 2.

As best seen in Figure 6, the tubular spring holder or plunger 40 is adapted to reciprocate in a stationary cylindrical guide barrel 47 which is fashioned with an upper exterior annular flange 48 over which the closure plate 42 is clamped by bolts 49, and the removable actuating unit for the tappet is thus fastened within a cylindrical sleeve or portion 50 of the tappet housing T.

In Figure 6 I have indicated various ducts as 51 through which oil, under pressure from the lubricating system or pump of the engine, is supplied to lubricate the tubular plunger 40 as it reciprocates in the guide barrel 47; and these ducts also supply oil to the interior of the tubular plunger 40 for lubrication of parts as well as for "floating" the bearing block 39 so that it provides a constant connection between the push-rod 37 and the reciprocating plunger 40. This constant fluid connection between the push-rod and its extension provided by the lower end portion of the tubular plunger compensates for any tendency toward lost motion of adjoining parts, eliminates back-lash when the valve operating mechanism is opening and closing the valves, and incidentally insures a noiseless and smooth operation of the working parts, when the engine is in operation.

The constant supply of oil under pressure in the oil chamber 39' of the bearing block and in the recess in the bottom of the tubular plunger in which the block 39 may reciprocate, is controlled by a check valve or valve device 52 in the nature of a tubular threaded plug 52 that is screwed in the reduced and threaded end of the bore of the tubular plunger 40. This valve device is provided with interior oil ducts as 51ª, and a valve chamber in which a spring-pressed ball-valve 52' is seated, as seen in Figure 7. Oil under pressure is supplied from the oil ducts 51 into the interior ducts 51ª of the valve device, past the spring closed check valve 52' and through the ported end of the plug 52 into the oil chamber or recess 39' of the bearing block, as well as into the tubular plunger to lubricate the bearing block. As best seen in Figure 6 the upper ported end of the valve-plug 52 projects up into the oil chamber 39' and the oil under pressure supplied beneath the bearing block automatically holds the bearing block 39 in close contact with the head 38 to provide a constant fluid connection between the block (with the push-rod) and the tubular plunger. Thus, if the block 39 has been lifted by oil under pressure from its seat as in Fig. 6 to compensate for slack or a loose connection of adjoining parts, a fluid joint is formed between the lifted block and the plunger, and as the cam-actuated plunger 40 is lifted this fluid joint is maintained by closing of the check valve 52' that prevents displacement of oil from the fluid joint. After the working stroke that lifts the tappet plunger and push rod and rocks the tappet lever, the spring 41 depresses the tubular plunger to hold the cam rollers in contact, and the springs 14, 27, and 27' lift the cross head, rock the tappet lever and depress the push-rod and bearing block with the tubular plunger.

Thus all of the adjoining, or contacting parts of the operating mechanism are maintained in close assembly by the use of the springs and adjustable parts, together with the use of the fluid connection or joint that "floats" the bearing block within the tubular plunger, so that back-lash due to loose connections or lost motion is eliminated together with undesirable noises.

Each valve is held closed by its spring 14, and the cap nuts 17 screwed on the upper threaded ends of the tubular stems receive the smooth tappet ends 20 of the threaded bushings 19, so that when the cross-head is depressed due to the cam movement, these ends 20 perform the functions of tappets in the recesses 18 to depress and open the exhaust valves.

The screw adjustment of the bushings 19 assists in close and precise timing of the valves and insures close contact between adjoining parts of the tappet heads 17 and the tappet ends 20. The cross head 22 on which the tappets are mounted is also resiliently supported by its springs 27 and 27' and the tappet levers or rocker arms 31, 32, are held in contact with the pins 29 under tension of springs 41 and the action of the cam 46 on the cam shaft 46'.

In Figure 1 two oil troughs 53 and 53' are shown connected with oil pipes 54, and depending oil pipes 55 extend from the troughs down through the tubular stems into the hollow valves. Oil for both cooling purposes and lubrication flows out of the lower end nozzles of the depending pipes 55 and thence up through the valve stems 8 and out through the upper open ends of the stems.

As indicated in Figure 2 the cylinder head 1 and the tappet housing T are both located above or over the engine block, and the cover C encloses the working parts for protection of these parts and to prevent escape or waste of lubricating and cooling oil, and the parts are readily accessible when the cover has been removed. The cylinder head 1 indicated in Figure 2 is preferably fashioned of cast or semi-cast steel and provided with large water passages 6 and 7 which receive circulating water currents from the cylinder liner below the cylinder-head (not shown) and the water passages as well as the exhaust passages of the cylinder head are connected to their manifolds that extend alongside the cylinders of the multi-cylinder engine.

Having thus fully described my invention, what I claim as new and desire to secure by Letters Patent is:

1. In a valve operating mechanism, the combination with a fixed guide barrel, a spring-depressed tubular plunger open at its upper end and closed at its lower end and reciprocable in the guide, and means for intermittently lifting the plunger, of a spring-returned push-rod extending into the plunger, a block having an upper bearing-recess for the push rod, an open bottom oil-chamber and mounted in the lower end of the plunger, a check-valve unit also mounted in the lower end of the plunger and projecting into said oil chamber, and means for supplying fluid under pressure to said unit, whereby oil under pressure enters said chamber when the plunger is depressed with relation to the block.

2. In a valve operating mechanism, the combination with a fixed guide-barrel, a spring-depressed tubular plunger open at its upper end, closed at its lower end and reciprocable in the guide-barrel, and means for intermittently lifting the plunger, of a spring-returned push-rod extending into the plunger, a block mounted in the lower end of the plunger having an upper bearing seat for the push rod and an open bottom oil-chamber, a check-valve unit mounted in the lower end of the plunger and projecting upwardly into said oil chamber, and means for supplying oil under pressure beneath the block when the plunger is relatively depressed.

3. In a valve operating mechanism, the combination with a guide-barrel having an upper exterior flange and mounted in an engine head, a cover-plate having an open center and fixed to said head, a tubular plunger open at its upper end and closed at its lower end and mounted in the guide-barrel, said plunger having an interior recess and an annular shoulder above the recess, and a depressing spring interposed between said plate and shoulder, and means for intermittently lifting the plunger, of a spring returned push-rod extending into the plunger, a block mounted in the lower end of the plunger having an upper bearing seat for the push-rod and an open bottom oil-chamber, a check valve unit mounted in the lower end of the plunger and projecting into said chamber, and means for supplying oil under pressure through the check valve unit and under the block when the plunger is relatively depressed.

4. In a hydraulic tappet, the combination with a ported tubular spring-pressed plunger having a chamber, a floating block having an upper recess and a lower oil chamber and reciprocable in said first chamber, and a push-rod having a spherical bearing head in said recess, of a hollow valve-plug threaded in the tubular plunger and opening into said lower oil chamber, said valve-plug having an oil-duct communicating with the tubular ported plunger, and a spring-seated check valve in said valve-plug unseated by fluid pressure, whereby the floating block is held in constant engagement with the push-rod.

FRANK B. YINGLING.